United States Patent
Lee

(10) Patent No.: US 11,228,815 B2
(45) Date of Patent: Jan. 18, 2022

(54) DISPLAY APPARATUS AND OPERATION METHOD OF THE SAME

(71) Applicant: SAMSUNG ELECTRONICS CO., LTD., Suwon-si (KR)

(72) Inventor: Hoyub Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 16/284,067

(22) Filed: Feb. 25, 2019

(65) Prior Publication Data
US 2019/0268666 A1 Aug. 29, 2019

(30) Foreign Application Priority Data

Feb. 26, 2018 (KR) .................... 10-2018-0022967

(51) Int. Cl.
| | |
|---|---|
| *H04N 21/485* | (2011.01) |
| *H04N 21/466* | (2011.01) |
| *H04N 21/45* | (2011.01) |
| *G06N 20/00* | (2019.01) |
| *H04B 17/318* | (2015.01) |
| *H04W 4/02* | (2018.01) |

(Continued)

(52) U.S. Cl.
CPC ......... *H04N 21/4858* (2013.01); *G06N 20/00* (2019.01); *H04B 17/318* (2015.01); *H04L 67/14* (2013.01); *H04N 21/4532* (2013.01); *H04N 21/4668* (2013.01); *H04W 4/023* (2013.01); *H04W 4/80* (2018.02); *H04W 76/14* (2018.02)

(58) Field of Classification Search
CPC ....................... H04N 21/4858; H04N 21/4532
See application file for complete search history.

(56) References Cited

U.S. PATENT DOCUMENTS

| | | | |
|---|---|---|---|
| 2002/0194586 A1 | 12/2002 | Gutta et al. | |
| 2014/0053189 A1* | 2/2014 | Lee .................... | H04N 21/4751 725/37 |

(Continued)

FOREIGN PATENT DOCUMENTS

| | | |
|---|---|---|
| KR | 2003-0020984 A | 3/2003 |
| KR | 10-2014-0023852 A | 2/2014 |

(Continued)

OTHER PUBLICATIONS

Korean Office Action dated Aug. 19, 2021 for KR Application No. 10-2018-0022967.

*Primary Examiner* — Tuan H Nguyen
(74) *Attorney, Agent, or Firm* — Nixon & Vanderhye P.C.

(57) ABSTRACT

Provided is an artificial intelligence (AI) system for providing functions similar to the human brain, such as recognition, determination, etc., using a machine learning algorithm, e.g., deep learning, and an application thereof. A method includes establishing communication with a first device located in an available zone, the available zone being a range in which content is viewable; receiving a communication signal from a second device; receiving, from the first device, connection information of the first device and the second device connected to the first device; and identifying whether the second device is located in the available zone based on the communication signal received from the second device and the connection information of the first device and the second device.

20 Claims, 13 Drawing Sheets

(51) Int. Cl.
*H04W 4/80* (2018.01)
*H04W 76/14* (2018.01)
*H04L 29/08* (2006.01)

(56) References Cited

U.S. PATENT DOCUMENTS

2016/0316263 A1   10/2016  Seo et al.
2017/0078943 A1*  3/2017  Jurzak .................. H04W 76/14
2017/0344223 A1*  11/2017  Holzer ..................... G06K 9/72

FOREIGN PATENT DOCUMENTS

| KR | 10-1526491 | 6/2015 |
| KR | 10-2016-0125295 A | 10/2016 |
| KR | 10-1708130 | 2/2017 |
| KR | 10-1762930 | 7/2017 |

* cited by examiner

FIG. 3

| USER INFORMATION (21) | STRENGTH OF TRANSMISSION POWER OF SECOND DEVICE (23) | INFORMATION OBTAINED BY SENSING MOTION OF SECOND DEVICE (25) | INFORMATION REGARDING RELATIONSHIP WITH SECOND DEVICE (26) |
|---|---|---|---|
| SENSING INFORMATION (22) | DURATION OF CONNECTION WITH SECOND DEVICE (24) | | |

DISPLAY APPARATUS AND OPERATION METHOD OF THE SAME

CROSS-REFERENCE TO RELATED APPLICATION

This application is based on and claims priority under 35 U.S.C. § 119 to Korean Patent Application No. 10-2018-0022967, filed on Feb. 26, 2018, in the Korean Intellectual Property Office, the disclosure of which is incorporated by reference herein in its entirety.

BACKGROUND

1. Field

The disclosure relates to a display apparatus and a method of operating the same, and for example, to a display apparatus for accurately identifying a number of viewers and a method of operating the same.

2. Description of Related Art

Artificial intelligence (AI) systems may refer to computer systems capable of achieving a level of human intelligence, self-learning, self-determining, and becoming smarter, unlike existing rule-based smart systems. As use of such AI systems increases, recognition rates thereof further improve and users' preferences can be more accurately understood. Accordingly, the existing rule-based smart systems are gradually being replaced with deep-learning-based AI systems.

AI technology includes machine learning (deep learning) techniques and element techniques using machine learning techniques.

Machine learning techniques may refer, for example, to algorithms for self-sorting/learning features of input data. The element techniques may refer, for example, to techniques for imitating functions of the human brain such as recognition, determination, etc. using a machine learning algorithm such as deep learning, and includes technical fields, including linguistic comprehension, visual comprehension, inference/prediction, knowledge representation, motion control, etc.

Various fields to which AI technology is applicable will be described below. Linguistic comprehension may refer, for example, to a technique for identifying and applying/processing human language/characters, and includes natural-language processing, machine translation, a dialogue system, query and response, speech recognition/synthesis, etc. Visual comprehension may refer, for example, to a technology for identifying and processing things in terms of human perspective, and includes object recognition, object tracking, image searching, identification of human beings, scene comprehension, space comprehension, image enhancement, etc. Inference prediction may refer, for example, to a technique for identifying and logically reasoning information and making predictions, and includes knowledge/probability-based reasoning, optimization prediction, preference-based planning, recommendation, etc. Knowledge representation may refer, for example, to a technology for automatically processing human experience information according to knowledge data, and includes knowledge building (data generation/classification), knowledge management (data utilization), etc. Motion control may refer, for example, to a technique for controlling self-driving of a vehicle and a robot's movement, and includes motion control (navigation, collision, traveling), operation control (behavior control), etc.

With the development of communication technology and various media, the broadcasting and communication industries are rapidly developing. Recently, in multimedia service systems, services providing appropriate multimedia content or advertisements based on users' consumption patterns are being considered. Accordingly, in the broadcasting and communication industries, it is very important to identify viewers who watch smart TVs and to provide content corresponding to the viewers' interest.

SUMMARY

Example embodiments of the disclosure provide a display apparatus for effectively determining the number of viewers and providing a customized screen, and a method of operating the same.

Additional aspects will be set forth in part in the description which follows and, in part, will be apparent from the description.

According to an example embodiment of the disclosure, a method includes establishing communication with a first device located in an available zone, the available zone being a range in which content is viewable; receiving, from the first device, connection information of a second device connected to the first device; and determining whether the second device is located in the available zone based on information regarding a connection between the first device and the second device.

According to another embodiment of the disclosure, a display apparatus includes a display providing a screen customized for a user, a communicator comprising communication circuitry configured to communicate with a device located in an available zone, the available zone being a range in which content is viewable, a processor, and a memory storing instructions executable by the processor. The processor may be configured to, by executing the instructions, control the display to: establish communication with a first device located in the available zone, receive, from the first device, connection information of a second device connected to the first device, and identify (determine) whether the second device is located in the available zone based on information regarding a connection between the first device and the second device.

According to another example embodiment of the disclosure a non-transitory computer-readable recording medium storing a program for implementing the method is provided.

BRIEF DESCRIPTION OF THE DRAWINGS

The above and other aspects, features, and advantages of certain embodiments of the disclosure will be more apparent from the following detailed description, taken in conjunction with the accompanying drawings, in which:

FIG. 3 is a diagram illustrating an example structure of information transmitted from a first device to a display apparatus, according to an embodiment of the disclosure;

DETAILED DESCRIPTION

Advantages and features of the disclosure and methods of achieving them will become apparent with reference to embodiments of the disclosure in conjunction with the accompanying drawings. The disclosure may, however, be embodied in many different forms and should not be understood as being limited to the embodiments set forth herein. Rather, these embodiments of the disclosure are provided so that the disclosure will be thorough and complete and will convey the concept of the disclosure to those of ordinary skill in the art. The disclosure may be defined, for example, by the claims.

In the disclosure, general terms that have been widely used nowadays are selected, when possible, in consideration of functions of the disclosure, but non-general terms may be selected according to the intentions of technicians in the this art, precedents, or new technologies, etc. Some terms may be arbitrarily chosen. In this case, the meanings of these terms will be explained in corresponding parts of the disclosure. Accordingly, the terms used herein should be defined not based on the names thereof but based on the meanings thereof and the whole context of the disclosure.

Throughout the disclosure, the expression "at least one of a, b or c" indicates only a, only b, only c, both a and b, both a and c, both b and c, all of a, b, and c, or variations thereof.

Figure 1:
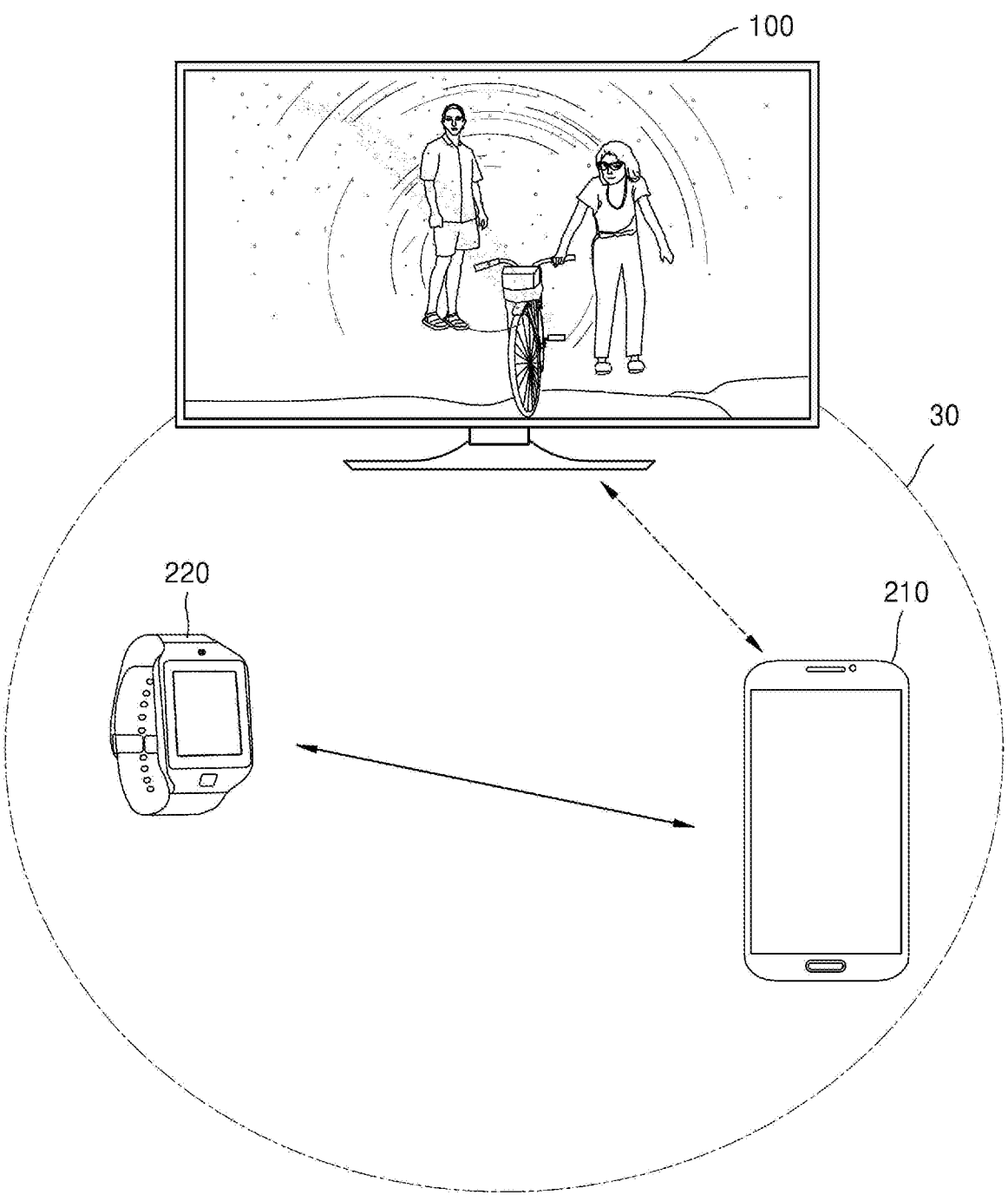
FIG. 1 is a diagram illustrating an example configuration of a system for determining the number of viewers, according to an embodiment of the disclosure.

FIG. 1 is a diagram illustrating an example configuration of a system to determine the number of viewers, according to an embodiment of the disclosure.

In an example embodiment of the disclosure, a display apparatus 100 may, for example, be an electronic device capable of outputting content. For example, the display apparatus 100 may, for example, and without limitation, be a smart TV but is not limited thereto. The content may be broadcast content provided by, for example, and without limitation, terrestrial broadcasting, cable broadcasting, satellite broadcasting, Internet broadcasting, or the like, and/or may be video-on-demand (VOD) content provided via a VOD service.

A first device 210 and/or a second device 220 may be any of various electronic devices which a user may carry or wear. For example, the first device 210 and/or the second device 220 may be, but is not limited to, a smart phone, a tablet PC, a wearable device, a mobile phone, a personal digital assistant (PDA), a laptop computer, a media player, a micro-server, a global positioning system (GPS) device, an electronic book terminal, a digital broadcast terminals, a navigation system, a kiosk, an MP3 player, a digital camera, or any other mobile computing devices.

While the display apparatus 100 outputs content, a user of each of the first device 210 and the second device 220 may view content and/or use a function of the first or second device 210 or 220. Although FIG. 1 illustrates only the first device 210 and the second device 220, a plurality of other electronic devices may be located near the display apparatus 100 and there may be users of the respective electronic devices.

Referring to FIG. 1, the display apparatus 100 may output content. The display apparatus 100 may receive and output content via a broadcast channel or the Internet. The display apparatus 100 may receive from an external device connected thereto via wire or wirelessly, and output the content. Content may be stored in a memory included in the display apparatus 100 and may be output. The content may include content information identifying the content. The display apparatus 100 may identify the output that is being output, based on the content information.

The first device 210 may transmit a signal including sensing information to the display apparatus 100. The first device 210 may be embodied in various forms, e.g., a wrist watch, glasses, earphones, a ring, a bracelet, etc., but is not limited thereto.

The sensing information may include, for example, information sensed by at least one sensor included in the first device 210. Examples of the at least one sensor of the first device 210 may include, but are not limited to, an acceleration sensor, a gyroscope, a magnetometer, a GPS sensor, an inertial measurement unit (IMU), a biosensor, a gesture sensor, and the like. For example, the sensing information may include acceleration information, gyro information, magnetic information, bio-signal information, magnetic information, or the like sensed by the first device 210. Each of the acceleration information, the gyro information, and the magnetic information may include values of an x-axis, a y-axis, and a z-axis.

The first device 210 may transmit a signal by various short-range communication methods or low-power communication methods. A short-range communication module may refer, for example, to a module including various communication circuitry for establishing short-range communication with a device located within a certain distance. Examples of short-range communication technology may include, but are not limited to, wireless local area network (LAN), Wi-Fi, Bluetooth, ZigBee, Wi-Fi Direct, ultra wideband (UWB), infrared data association (IrDA), Bluetooth Low Energy (BLE), Near-Field Communication (NFC), etc. For example, a Bluetooth beacon signal may be transmitted by a BLE-based broadcasting scheme. The display apparatus 100 may receive a Bluetooth beacon signal even when the display apparatus 100 is not paired with the first device 210.

The display apparatus 100 may receive a signal including the sensing information from the first device 210. The display apparatus 100 may receive the signal discretely over time. For example, the display apparatus 100 may periodically receive a signal. The display apparatus 100 may identify (determine) whether the first device 210 is located in an available zone 30, based, for example, on a strength of the received signal and the sensing information included in the signal. The strength of the received signal may, for example, be a Bluetooth signal reception strength indicator.

The available zone 30 may refer, for example, to an area in which the display apparatus 100 is viewable. The available zone 30 may be set based, for example, and without limitation, on a distance from the display apparatus 100, a viewing angle of a screen of the display apparatus 100, a structure of a space in which the display apparatus 100 is present, e.g., the presence or absence of a wall, or the like. Content output from the display apparatus 100 may be viewed when a user is located within the available zone 30, and may not be viewed when the user is located outside the available zone 30. Thus, when the display apparatus 100 identifies that the first device 210 is in the available zone 30, it may be assumed that a user of the first device 210 is viewing the content. When the display apparatus 100 identifies that the first device 210 is outside the available zone 30, it may be assumed that the user of the first device 210 does not view the content. A result of identifying whether the first device 210 is within the available zone 30 using the display apparatus 100 may be data of measurement of the number of persons watching the content. Hereinafter, as used herein, the term "identification result" may refer, for example, to a result of identifying whether the first device 210 is in the available zone 30 using the display apparatus 100.

The display apparatus 100 may establish communication with the first device 210, based on connection using, for example, and without limitation, a Bluetooth signal. The display apparatus 100 may identify whether the first device 210 is within the available zone 30, based, for example, and without limitation, on the strength of the received signal and the sensing information included in the signal. The strength of the received signal may, for example, be a Bluetooth signal reception strength indicator.

Bluetooth is used to exchange information in a simple manner using radio waves between information devices that are several meters to several tens of meters distant from each other. Bluetooth which is one of the industrial standards for personal area networks (PANs) uses an ISM band of 2.45 GHz. The speeds of Bluetooth versions 1.1 and 1.2 are about 723.1 kbps. Bluetooth version 2.0 has an enhanced data rate (EDR) and thus has a speed of 2.1 Mbps. Bluetooth is a concept replacing RS-232 and wired USB, similar to the concept of Wi-Fi replacing Ethernet. The Secure And Fast Encryption Routine (SAFER) is used for encryption. Keyword-based pairing may be performed to establish a reliable connection between multiple devices.

Bluetooth 1.1 version has been approved as an IEEE 802.15.1 IEEE standard, supports non-encrypted channels, and is capable of receiving a received signal strength indicator (RSSI). Bluetooth version 1.2 is compatible with Bluetooth version 1.1, and supports Extended Synchronous Connections (eSCO) to prevent degradation of the quality of a voice or sound signal due to a packet error or retransmission.

In an example embodiment of the disclosure, the distance between the display apparatus 100 and a plurality of devices may be identified from the strengths of transmitted or received signals of a Bluetooth signal strength indicator (RSSI) exchanged between the display apparatus 100 and the plurality of devices. In an example embodiment of the disclosure, the display apparatus 100 may identify whether the strength of a signal received from the first device 210 is equal to or greater than a threshold value. In an example embodiment of the disclosure, the signal received from the first device 210 may be a Bluetooth connection signal. The display apparatus 100 may receive a power ON signal including information regarding a first user from the first device 210 when the strength of a Bluetooth signal received from the first device 210 is equal to a threshold value. The display apparatus 100 may identify that the first device 210 is in the available zone 30. The display apparatus 100 may provide a first screen corresponding to the information regarding the first user information when the power ON signal is received from the first device 210.

In an example embodiment of the disclosure, the display apparatus 100 may receive connection information of second device 220 connected to the first device 210 from the first device 210. In an example embodiment of the disclosure, the first device 210 and the second device 220 may be connected through Bluetooth communication.

In an example embodiment of the disclosure, the display apparatus 100 may identify that the second device 220 is in the available zone 30, when the strength of a connection between the first device 210 and the second device 220 is greater than or equal to a certain strength and a time period for which the connection between the first device 210 and the second device 220 lasts is greater than or equal to a certain time period. In an example embodiment of the disclosure, the display apparatus 100 may identify a user of the first device 210 and a user of the second device 220 to be viewers.

Figure 2:
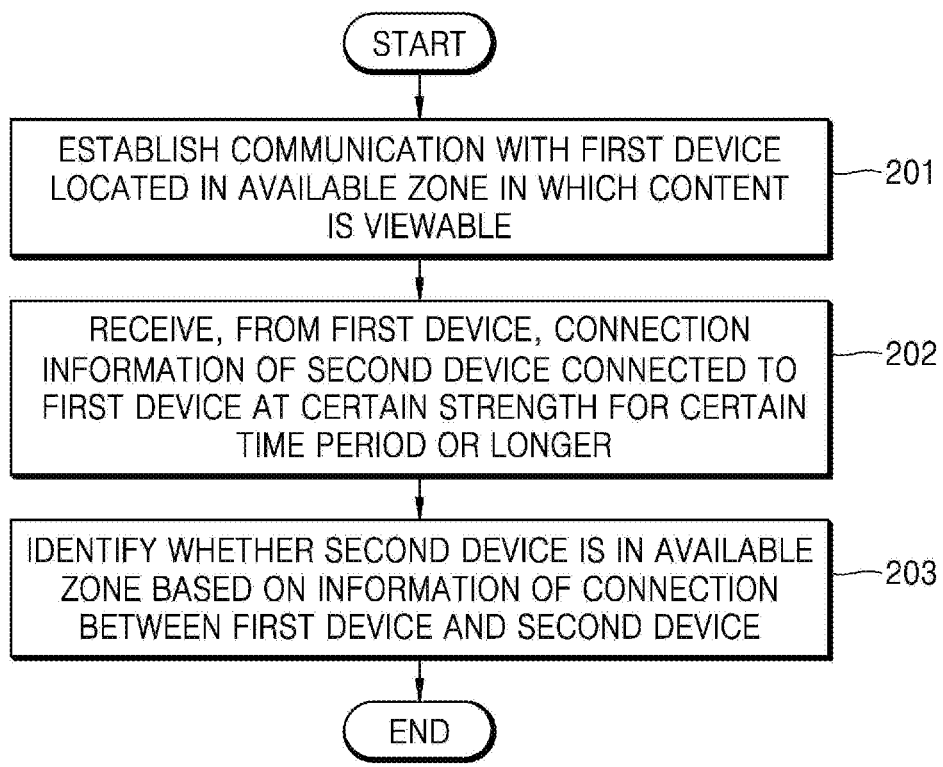
FIG. 2 is a flowchart illustrating an example method of determining a number of viewers, according to an embodiment of the disclosure.

FIG. 2 is a flowchart illustrating an example method of determining the number of viewers, according to an embodiment of the disclosure.

In operation 201, the display apparatus 100 according to an embodiment of the disclosure may establish communication with the first device 210 located in an available zone. The available zone may be a range in which content is viewable. The display apparatus 100 may identify a user of the first device 210 as a viewer through Bluetooth connection to the first device 210.

In operation 202, the display apparatus 100 according to an embodiment of the disclosure may receive connection information of the second device 220 connected to the first device 210 from the first device 210. In an example embodiment of the disclosure, the display apparatus 100 may receive, from the first device 210, information obtained by sensing the strength of connection between the first device 210 and the second device 220, a time period for which the connection lasts, and a location and operation of the second device 220. In an example embodiment of the disclosure, the display apparatus 100 may receive information regarding communication between the first device 210 and the second device 220 from the first device 210.

In an example embodiment of the disclosure, the display apparatus 100 may identify whether the second device 220 is in the available zone, based on gyro information, acceleration information, and magnetic information of the second device 220 which are received from the first device 210. In an example embodiment of the disclosure, the display apparatus 100 may identify that the second device 220 is moved at a point at which a degree of fluctuation of sensing information of the second device 220 is large. The display apparatus 100 may increase the accuracy of a determination result by pre-processing a received signal or correcting the determination result according to the received signal.

The display apparatus 100 may preprocess a signal received from the first device 210, and identify whether the second device 220 is in the available zone, based on the preprocessed signal. The display apparatus 100 may discretely receive signals including sensing information from a wearable device over time, and may preprocess the discretely received signals. For example, the display apparatus 100 may periodically receive signals. The preprocessing may include, for example, data smoothing, moving average, and windowing but is not limited thereto. The display apparatus 100 may set in advance a window size for the preprocessing. The display apparatus 100 may set in advance an optimal window size through k-fold cross validation. The display apparatus 100 may preprocess the strength of a received signal, the sensing information, or both the strength of the received signal and the sensing information. The accuracy of determination may be increased and a miss detection rate may be reduced by preprocessing.

In operation 203, the display apparatus 100 according to an embodiment of the disclosure may identify whether the second device 220 is in the available zone based on information of a connection between the first device and the second device. In an example embodiment of the disclosure, the display apparatus 100 may identify that the second device 220 is in the available zone, when the strength of connection between the first device 210 and the second device 220 is greater than or equal to a certain strength and a time period for which the connection between the first device 210 and the second device 220 lasts is greater than or equal to a certain time period.

FIG. 3 is a diagram illustrating an example structure of information transmitted from a first device to a display apparatus, according to an embodiment of the disclosure.

In an example embodiment of the disclosure, the display apparatus 100 may receive, from the first device 210, user information 21 of the first device 210, sensing information 22 of the first device 210, a strength 23 of transmission power of the second device 220, a duration 24 of connection with the second device 20, information 25 obtained by sensing a motion of the second device 220, and information 26 regarding the relationship with the second device 220.

In an example embodiment of the disclosure, the user information 21 of the first device 210 may include information identifying a user of the first device 210. In an example embodiment of the disclosure, the user information 21 of the first device 210 may include a first user's personal information and content viewing history information, history information of an application used in the first device 210, and the like.

In an example embodiment of the disclosure, the sensing information 22 of the first device 210 may include information regarding an operation of the first device 210 sensed by a sensor of the first device 210. In an example embodiment of the disclosure, the display apparatus 100 may estimate a motion, orientation, direction, or position of the first device 210, based on the sensing information 22. The display apparatus 100 may estimate a magnitude of or a frequency of the motion of the first device 210, based on the sensing information 22. When acceleration information or gyro information included in the sensing information 22 is greater than a predetermined value, the display apparatus 100 may estimate that the first device 210 is moving. When the acceleration information or gyro information included in the sensing information 22 is greater than the predetermined value, the display apparatus 100 may identify that the first device 210 is not in an available zone.

The display apparatus 100 may estimate a behavior of a user of the first device 210, based on the sensing information 22. Examples of the user's behavior may include, for example, and without limitation, walking, sleeping, eating, etc. The sensing information 22 of the first device 210 may, for example, be a certain pattern or range, based on the user's behavior. The display apparatus 100 may set a pattern or range of sensing information corresponding to the user's behavior in advance. The display apparatus 100 may estimate the user's behavior matching sensing information included in a received signal.

In an example embodiment of the disclosure, the strength 23 of transmission power of the second device 220 may represent, for example, the strength of a transmission signal that the first device 210 receives from the second device 220. The display apparatus 100 may identify a position of the second device 220, based on the strength 23 of transmission power of the second device 220. For example, the display apparatus 100 may identify that the distance between the first device 210 and the second device 220 reduces as the strength 23 of transmission power of the second device 220 becomes increased.

In an example embodiment of the disclosure, the duration 24 of connection with the second device 20 may represent, for example, a time period for which a connection between the first device 210 and the second device 220 lasts. For example, when the duration 24 of connection with the second device 20 is equal to or less than a threshold value, the display apparatus 100 may identify that the second device 220 is moved from the vicinity of the first device 210 and thus is not located in the available zone.

In an example embodiment of the disclosure, the information 25 obtained by sensing a motion of the second device 220 may, for example, be information obtained by sensing a motion of the second device 220 by the first device 210. The display apparatus 100 may estimate a motion, orientation, direction, or position of the second device 220, based on the information 25. The display apparatus 100 may estimate a magnitude of or a frequency of a motion of the second device 220, based on the information 25. When the acceleration information or gyro information included in the sensing information 22 is greater than a predetermined value, the display apparatus 100 may estimate that the second device 220 is moving. When the acceleration information or gyro information included in the sensing information 22 is greater than the predetermined value, the display apparatus 100 may identify that the second device 220 is not in the available zone.

In an example embodiment of the disclosure, the information 26 regarding the relationship with the second device 220 may include, for example, information regarding communication between the first device 210 and the second device 220. The display apparatus 100 may identify a relation between a user of the first device 210 and a user of the second device 220, based on the information 26. In an example embodiment of the disclosure, the display apparatus 100 may determine content and an application to be recommended, based on the information 26.

Figure 4:
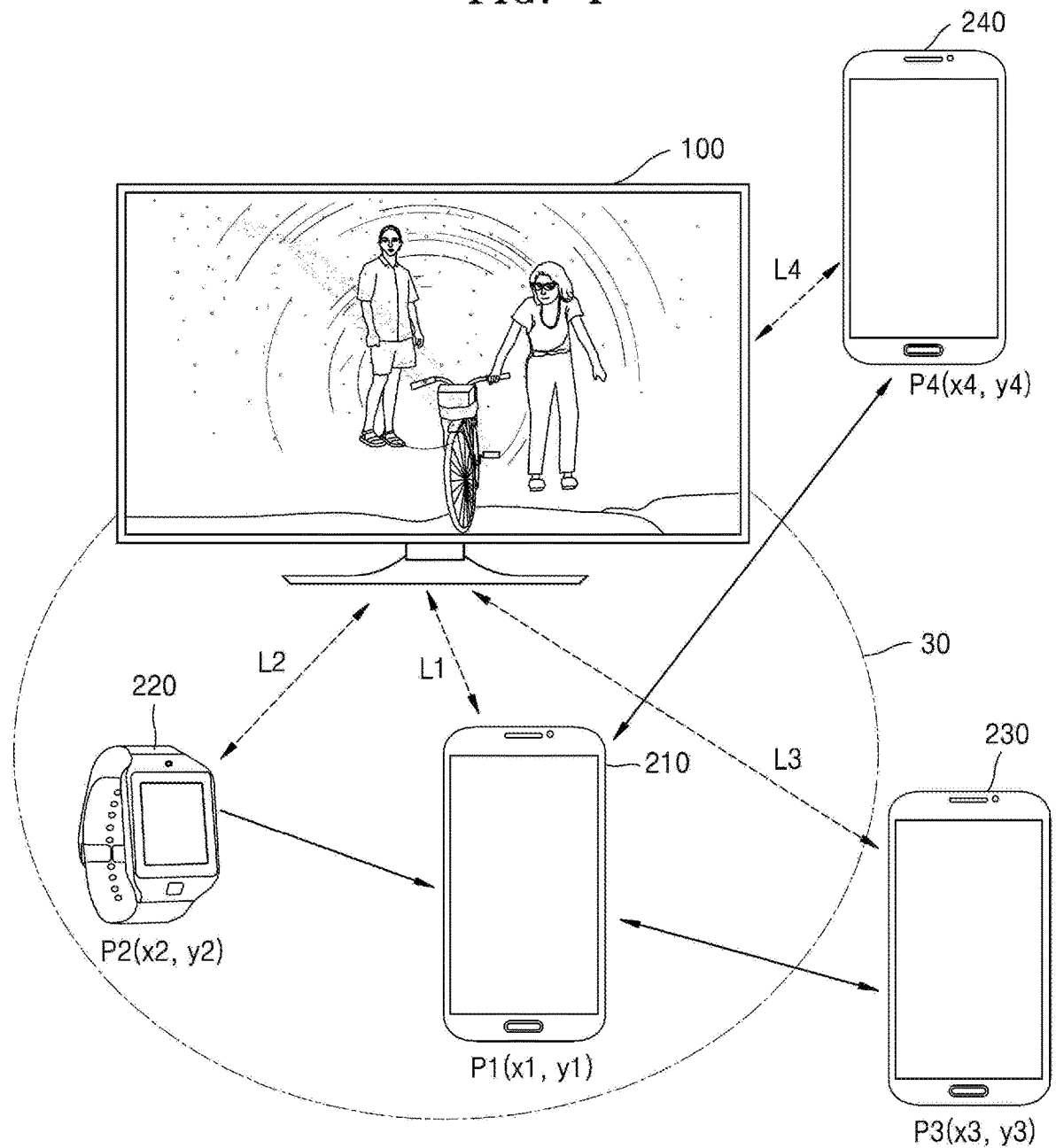
FIG. 4 is a diagram illustrating an example method of identifying a terminal located in an available zone, according to an embodiment of the disclosure.

FIG. 4 is a diagram illustrating an example method of identifying a terminal located in an available zone, according to an embodiment of the disclosure.

A display apparatus 100 may receive communication signals from devices located within a radius of short-range communication of the display apparatus 100. In an example embodiment of the disclosure, when a user wearing a smart watch 220 approaches the display apparatus 100, the display apparatus 100 may receive a Bluetooth signal from the smart watch 220. The display apparatus 100 may identify how close the smart watch 220 approaches the display apparatus 100, based on the strength of the received Bluetooth signal. For example, a Bluetooth signal may be received from devices located near the display apparatus 100, regardless of an area in which the display apparatus 100 is viewable and a blind zone area in which the display apparatus 100 cannot be viewed.

In an example embodiment of the disclosure, the display apparatus 100 may receive Bluetooth communication signals from a plurality of devices 210, 220, 230 and 240. The display apparatus 100 may identify a location of each of the plurality of devices 210, 220, 230, and 240, based on the strengths of the Bluetooth communication signals received from the plurality of devices 210, 220, 230, and 240. In an example embodiment of the disclosure, the display apparatus 100 may identify a location of each of the plurality of devices 210, 220, 230, and 240 when communication signals of certain strength or more are received from the plurality of devices 210, 220, 230, and 240 for a certain time period or longer. For example, when it is determined that that the strength of the communication signal received from the fourth device 240 is greater than that of the communication signal received from the second device 220, the display apparatus 100 may identify that the fourth device 240 is located closer thereto than the second device 220.

Referring to FIG. 4, the fourth device 240 is located behind the display apparatus 100, e.g., outside an available zone 30, and the second device 220 is located in the available zone 30. Thus, whether the plurality of devices 210, 220, 230 and 240 are in an effective viewing range cannot be accurately identified only by the strengths of Bluetooth signals received by the display apparatus 100. An embodiment of the disclosure will be described below, in which whether the plurality of devices 210, 220, 230, and 240 are in the available zone 30 is identified using communication signals transmitted and received between the plurality of devices 210, 220, 230 and 240.

In an example embodiment of the disclosure, the display apparatus 100 may identify, as a viewer, a user of a device identified to be located in the available zone 30 among a plurality of devices. For example, the display apparatus 100 may identify the first device 210 and the second device 220 as valid viewing terminals, and the third device 230 and the fourth device 240 as invalid viewing terminals, as will be described in detail below.

In an example embodiment of the disclosure, the display apparatus 100 may receive short-range communication signals from the plurality of devices 210, 220, 230 and 240. In an example embodiment of the disclosure, when communication signals from the plurality of devices 210, 220, 230 and 240 have a strength greater than or equal to a certain strength and are connected for a certain time period or longer, the display apparatus 100 may identify distances to the plurality of devices 210, 220, 230 and 240, based on the strengths of the plurality of devices 210, 220, 230 and 240.

In an example embodiment of the disclosure, the display apparatus 100 may identify a position P1(x1, y1) of the first device 210, based on sensing information received from the first device 210. In an example embodiment of the disclosure, the display apparatus 100 may identify a distance L1 between the first device 210 and the display apparatus 100, based on the position P1(x1, y1) of the first device 210.

In an example embodiment of the disclosure, the first device 210 may be connected to the second device 220 and the third device 230 through short-range communication. In an example embodiment of the disclosure, the first device 210 may receive location information from the second device 220 and the third device 230. In an example embodiment of the disclosure, the first device 210 may sense positions and operations of the second device 220 and the third device 230. In an example embodiment of the disclosure, the first device 210 may identify a position P2(x2, y2) of the second device 220 and a position of P3(x3, y3) of the third device 230.

In an example embodiment of the disclosure, the display apparatus 100 may receive information regarding the position P2(x2, y2) of the second device 220, the position P3(x3, y3) of the third device 230, and the position P4(x4, y4) of the fourth device 240 from the first device 210. The display apparatus 100 may identify a distance L2 between the second device 220 and the display apparatus 100, based on the position P2(x2, y2) of the second device 220. The display apparatus 100 may identify a distance L3 between the third device 230 and the display apparatus 100, based on the position P3(x3, y3) of the third device 230. The display apparatus 100 may identify a distance L4 between the fourth device 240 and the display apparatus 100, based on the position P4(x4, y4) of the fourth device 240.

In an example embodiment of the disclosure, the display apparatus 100 may identify whether the first device 210, the second device 220, the third device 230 and the fourth device 240 are in the available zone 30, based on the distances L1, L2, L3 and L4. For example, the display apparatus 100 may identify that the third device 230 located beyond a distance which is set with the available zone 30 is not in the available zone 30.

In an example embodiment of the disclosure, the display apparatus 100 may identify that the distance between the first device 210 and the fourth device 240 is greater than the distance which is set with the available zone 30. Thus, even when the fourth device 240 is located near the display apparatus 100, the display apparatus 100 may identify that the fourth device 240 is far from the first device 210 located in the available zone 30 and thus is not included in the available zone 30. Thus, the fourth device 240 is located near the display apparatus 100 and at a position other than the available zone 30. For example, the display apparatus 100 may identify that the fourth device 240 is located at the back of the display apparatus 100. That is, the display apparatus 100 may identify that a user of the fourth device 240 is not a valid viewer, when the strength of a communication signal received from the fourth device 240 is greater but it is determined that the strengths of communication signals from the first device 210 and the fourth device 240 are equal to or less than a certain strength.

Figure 5:
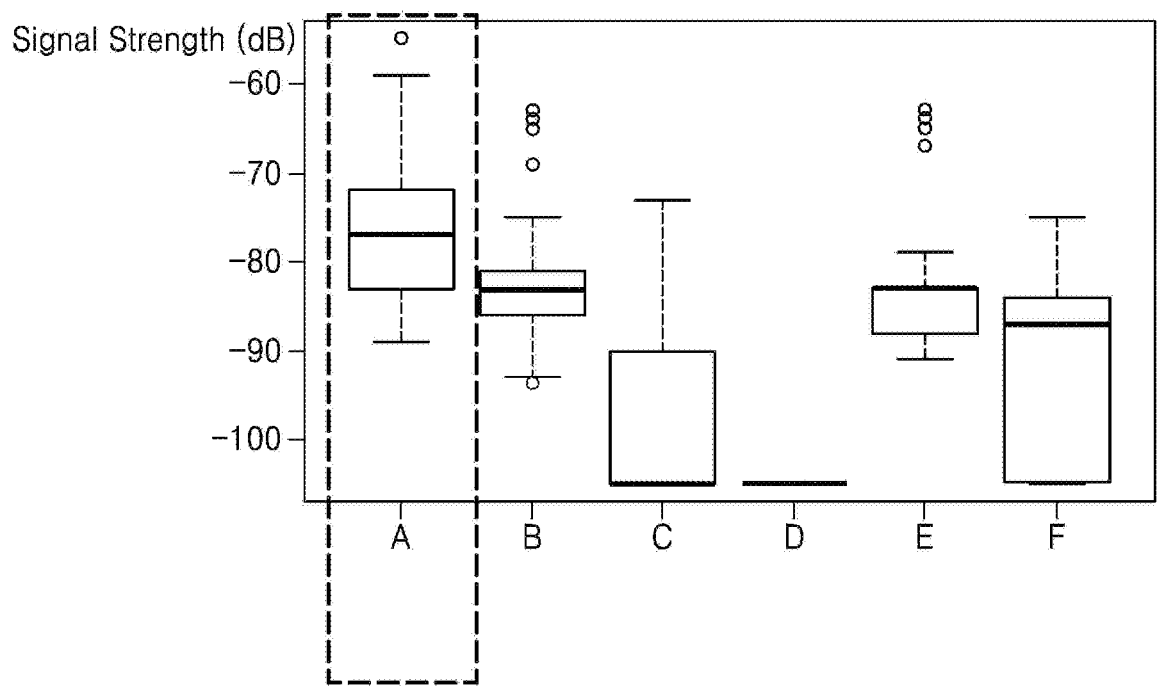
FIG. 5 is a graph illustrating an example of the relationship between strengths of connection signals of a first device and other devices, according to an embodiment of the disclosure.

FIG. 5 is a graph illustrating an example of the relationship between strengths of connection signals of a first device and other devices, according to an embodiment of the disclosure.

FIG. 5 illustrates the strengths of signals that the first device 210 receives from a device A, B, C, D and a device F, according to an embodiment of the disclosure. For example, FIG. 5 illustrates the strengths of signals received by the first device 210 from the devices A to F located in different places in a house where the display apparatus 100 is located in a living room. In this example, the living room in which the display apparatus 100 is located is an available zone.

In an example embodiment of the disclosure, the strengths of signals received by the first device 210 from other devices may represent different ranges or patterns according to a position. Thus, the display apparatus 100 may identify whether the other devices are in the available zone, based on the strengths of the signals received by the first device 210.

In an example embodiment of the disclosure, when the strength of the signal received from the device A is greater than a predetermined signal strength, the display apparatus 100 may identify that the device A is located in the available zone.

Figure 6:
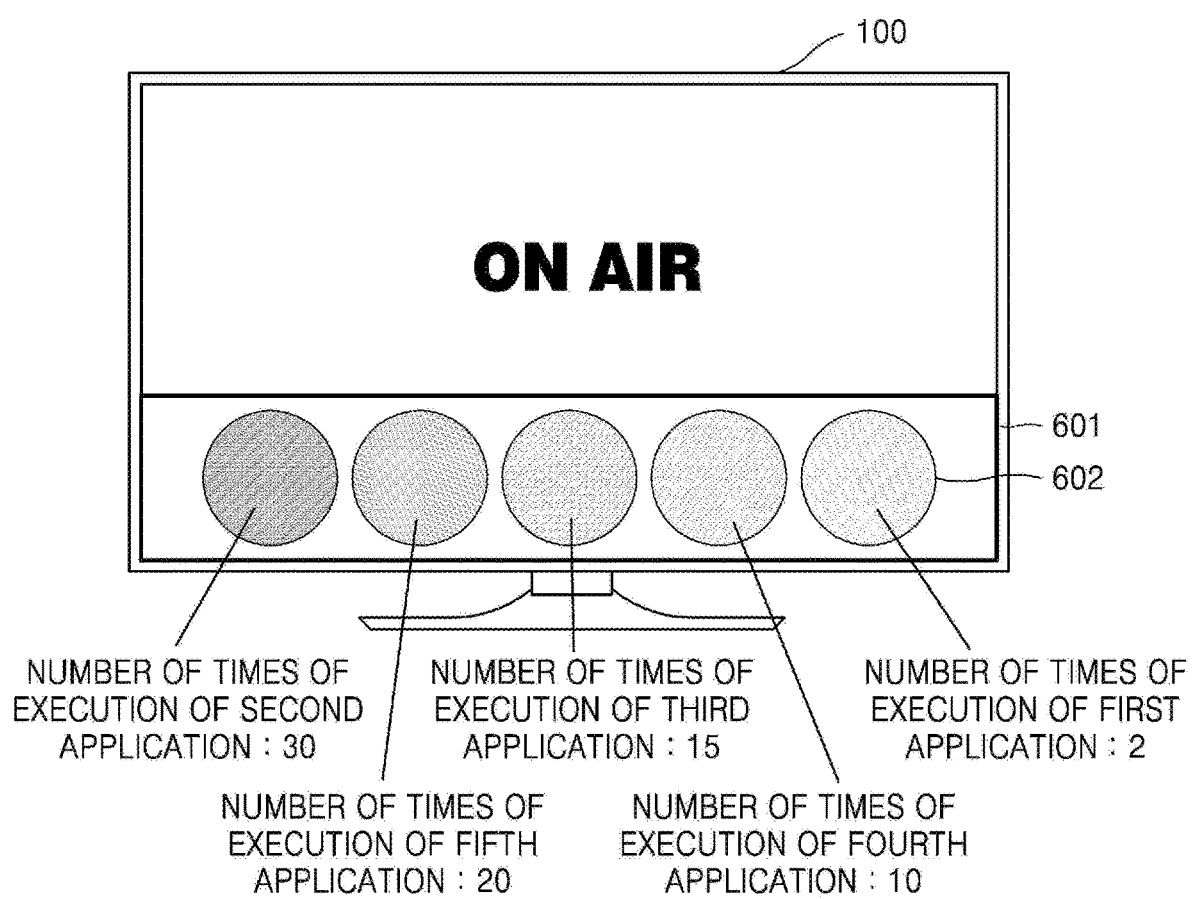
FIG. 6 is a diagram illustrating an example customized screen, for a first device, displayed on a display apparatus according to an embodiment of the disclosure.

FIG. 6 is a diagram illustrating an example of a customized screen, for a first device, displayed on a display apparatus according to an embodiment of the disclosure.

In an example embodiment of the disclosure, when the first device 210 is located in an available zone, the display apparatus 100 may provide a first screen customized for a first user of the first device 210.

In an example embodiment of the disclosure, the first screen may include at least one of the first user's latest viewing history and/or application update information received from the first device. For example, the display apparatus 100 may receive information of a personal healthcare application, such S-health, from the first device 210, and display the information in the first screen.

The first screen may provide content and an application to be recommended to the first user. The display apparatus 100 may determine content and an application to be recommended to the first user, based on the first user's viewing history and search history. The display apparatus 100 may obtain an artificial intelligence (AI) training model according to a result of learning a degree of interest of the first user, based on the first user's viewing history and search history. The display apparatus 100 may determine content and an application to be recommended using the obtained AI training model.

In an example embodiment of the disclosure, in the AI training model, information regarding communication between the first device 210 and the second device 220 may be analyzed to determine content viewing history information and application usage history information, weights may be given to content and applications according to periods of view of content, a number of times of viewing the content, the types of the content, the genres of the content, periods of use of the applications, a number of times of using the applications, and the types of the applications, and an application and content to be recommended may be determined based on the given weights.

In an example embodiment of the disclosure, the AI training model may be used to train a content recommendation model and an application recommendation model using training data including the first user's viewing history and search history. In this case, the content recommendation model and the application recommendation model may be pre-built models. For example, the content recommendation model and the application recommendation model may be models that are pre-built based on input basic training data (e.g., sample content, etc.). The content recommendation model and the application recommendation model may be constructed considering a field of application of a recognition model, a purpose of learning, or the performance of a computer of a device, etc. A data recognition model may be, for example, a model based on a neural network. For example, a model such as a Deep Neural Network (DNN), a Recurrent Neural Network (RNN), or a Bidirectional Recurrent Deep Neural Network (BRDNN) may be used but the disclosure is not limited thereto.

In an example embodiment of the disclosure, the display apparatus 100 may display a plurality of applications used by the first user via a separate window 601. In an example embodiment of the disclosure, the display apparatus 100 may arrange and display applications used by the first user according to a certain criterion. For example, the display apparatus 100 may arrange the applications according to a number of times of execution of the applications for a certain time period. For example, a number of times of execution of an icon 602 of a first application may be smallest and thus the icon 602 may be arranged at a tail portion of the separate window 601.

Figure 7:
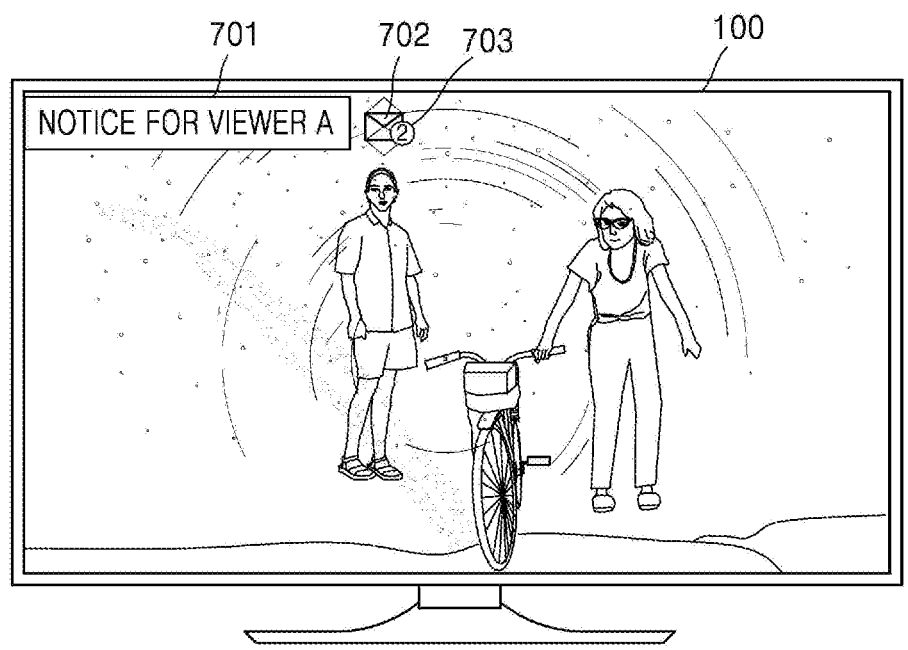
FIG. 7 is a diagram illustrating an example screen displayed on a display apparatus when a new device is identified in an available zone, according to an embodiment of the disclosure.

FIG. 7 is a diagram illustrating an example screen displayed on a display apparatus when a new device is identified in an available zone, according to an embodiment of the disclosure.

In an example embodiment of the disclosure, when it is identified that a new viewer appears in an available zone, the display apparatus 100 may display a notification message 701. The notification message 701 may include identification information of the new viewer. For example, when a previously registered viewer A is located in the available zone, the notification message 701 may give notice of the viewer A.

In an example embodiment of the disclosure, the display apparatus 100 may display notice of messages 702 associated to the viewer A's account. A number 703 of unread messages among the messages 702 associated with the viewer A's account may be displayed.

In an example embodiment of the disclosure, the display apparatus 100 may display details of the notification message 701, based on an input (e.g., a user input) to select the notification message 701. In an example embodiment of the disclosure, the display apparatus 100 may delete the notification message 701 when user input is not received for a certain time period.

Figure 8:
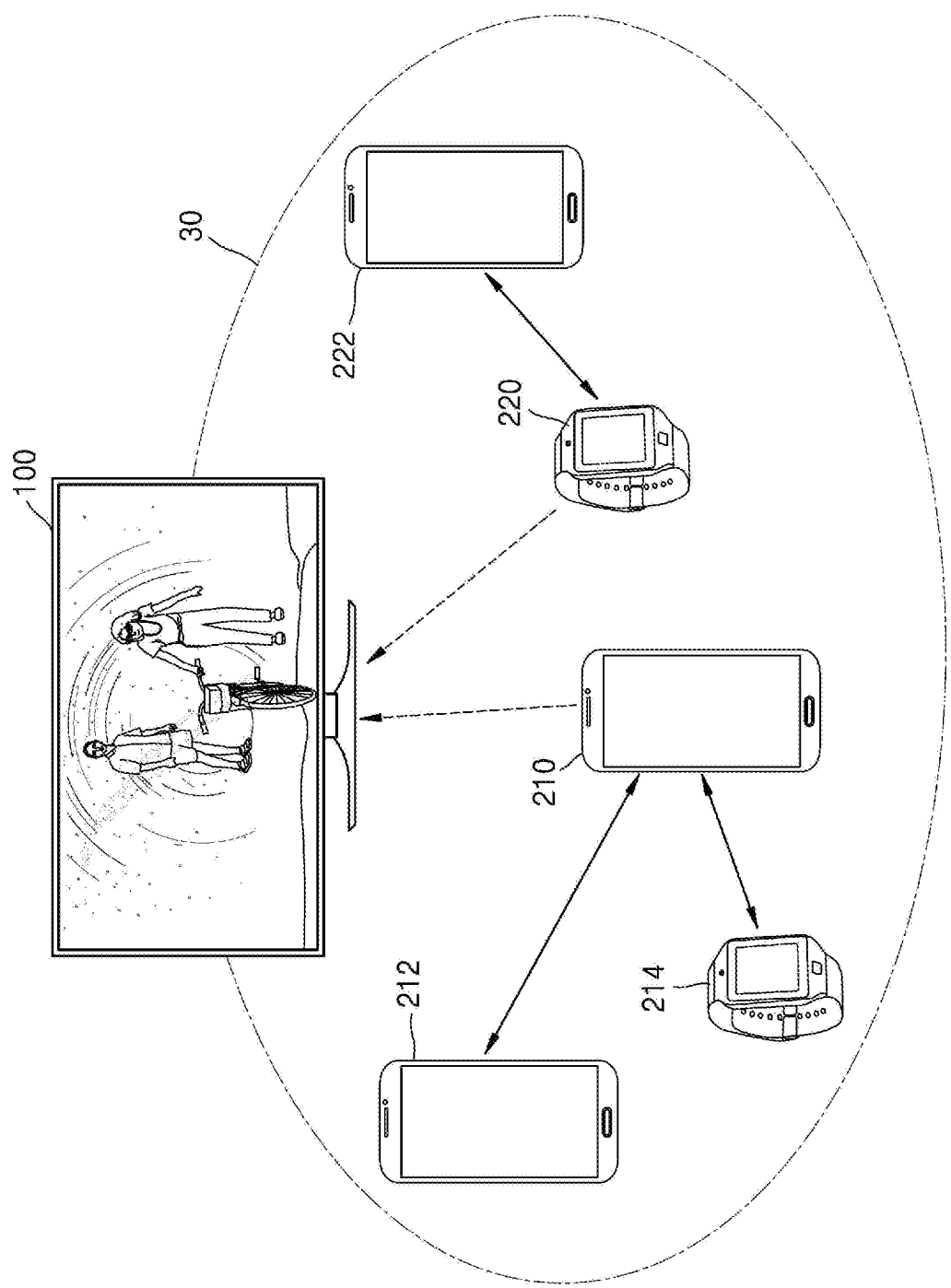
FIG. 8 is a diagram illustrating an example method of determining the number of viewers when a plurality of devices are located in an available zone, according to an embodiment of the disclosure.

FIG. 8 is a diagram illustrating an example method of determining the number of viewers when a plurality of devices are located in an available zone, according to an embodiment of the disclosure.

In FIG. 8, a user of a first device 210 and a user of a second device 220 have been registered in advance with the display apparatus 100, and the display apparatus 100 may establish communication with the first device 210 and the second device 220. In an example embodiment of the disclosure, the display apparatus 100 may identify that the first device 210 and the second device 220 are in an available zone 30, when communication having certain strength or more with the second device 220 is maintained for a certain time period or longer while communication having certain strength or more with the first device 210 is maintained for a certain time period or longer.

In an example embodiment of the disclosure, the first device 210 may establish communication with a first-1 device 212 and a first-2 device 214. In an example embodiment of the disclosure, connection of the first device 210 with the first-1 device 212 and the first-2 device 214 has strength greater than or equal to certain strength and is maintained for a certain time period or longer.

In an example embodiment of the disclosure, the display apparatus 100 may receive regarding the connection of the first device 210 with the first-1 device 212 and the first-2 device 214 from the first device 210. The display apparatus 100 may identify that the first-1 device 212 is in the available zone 30, based on the strength of connection between the first device 210 and the first-1 device 212, location information of the first-1 device 212, information regarding movement of the first-1 device 212, etc. Similarly, the display apparatus 100 may identify that first-2 device 214 is in the available zone 30.

In an example embodiment of the disclosure, the second device 220 may establish communication with a second-1 device 222. In an example embodiment of the disclosure, connection of the second device 220 with the second-1 device 222 has strength greater than or equal to certain strength and is maintained for a certain time period or longer.

In an example embodiment of the disclosure, the display apparatus 100 may identify that the second-1 device 222 is in the available zone 30, based on the strength of connection between the second device 220 and the second-1 device 222, location information of the second-1 device 222, information regarding movement of the second-1 device 222, etc.

The display apparatus 100 may identify that content is being watched using a total of five devices. In an example embodiment of the disclosure, the display apparatus 100 may provide a customized screen, based on communication information of the five devices.

In an example embodiment of the disclosure, first, the display apparatus 100 may customize a customized screen, based on information regarding communication between the first device 210 and the second device 220. In addition, the display apparatus 100 may customize a customized screen by assigning weights according to the number of devices connected to the first device 210 and the number of devices connected to the second device 220. For example, as the number of devices connected to the first device 210 is larger than that of devices connected to the second device 220, content and an application to be recommended may be determined by assigning a higher weight to user information of the first device 210.

Figure 9:
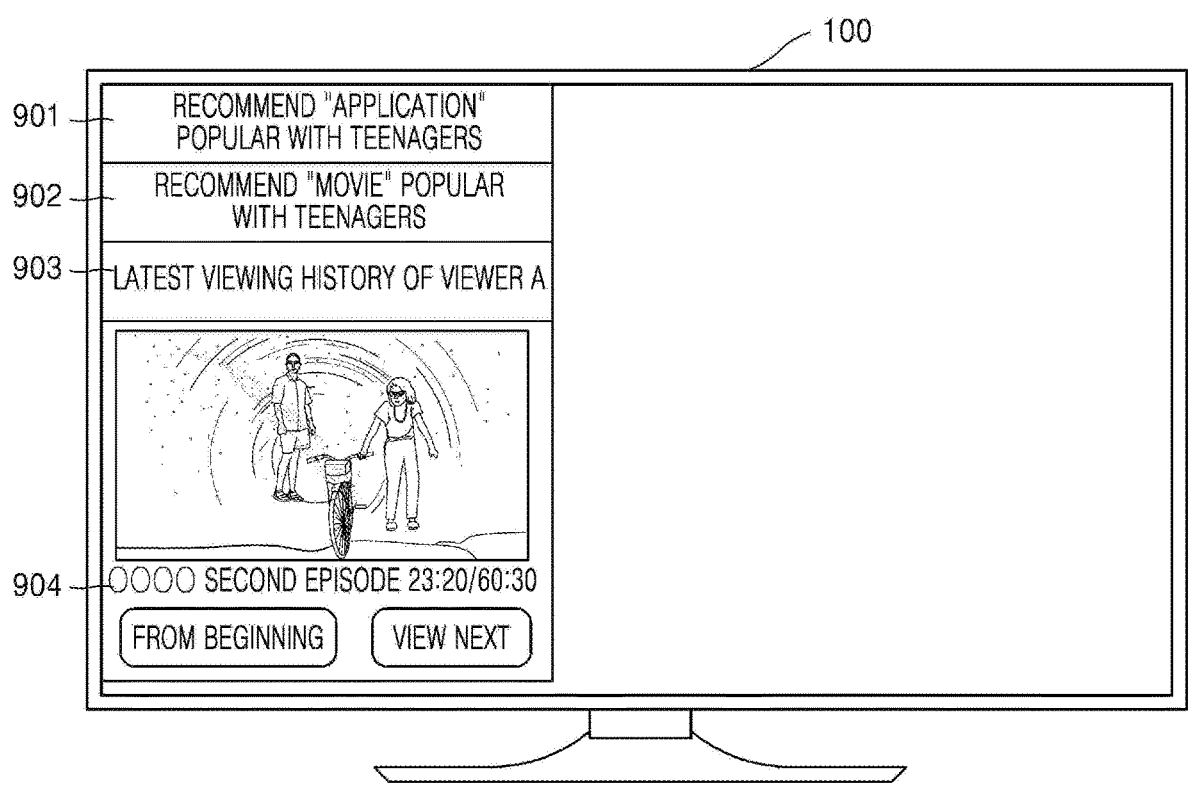
FIG. 9 is a diagram illustrating an example customized screen for a plurality of users, according to an embodiment of the disclosure.

FIG. 9 is a diagram illustrating an example of a customized screen for a plurality of users, according to an embodiment of the disclosure.

In an example embodiment of the disclosure, when it is determined that a plurality of devices are located in an available zone, the display apparatus 100 may provide a customized screen, based on information regarding the devices located in the available zone.

In an example embodiment of the disclosure, the display apparatus 100 may obtain an AI training model, based on a result of learning the relationship between the plurality of devices located in the available zone. In an example embodiment of the disclosure, the display apparatus 100 may use the obtained AI training model to determine content and an application to be recommended by reflecting a common interest of the plurality of devices.

For example, the display apparatus 100 may identify that common information regarding users of a plurality of devices in the available zone is that they are teenagers. The display apparatus 100 may display a message 901 recommending an application popular with teenagers and a message 902 recommending content popular with teenagers using artificial intelligence. The display apparatus 100 may display latest view history 903 and detailed viewing history 904 of a user of one of the plurality of devices. In an example embodiment of the disclosure, viewing history of a plurality of devices may be displayed by checking connection history regarding simultaneous connection of the plurality of devices.

Figure 10:
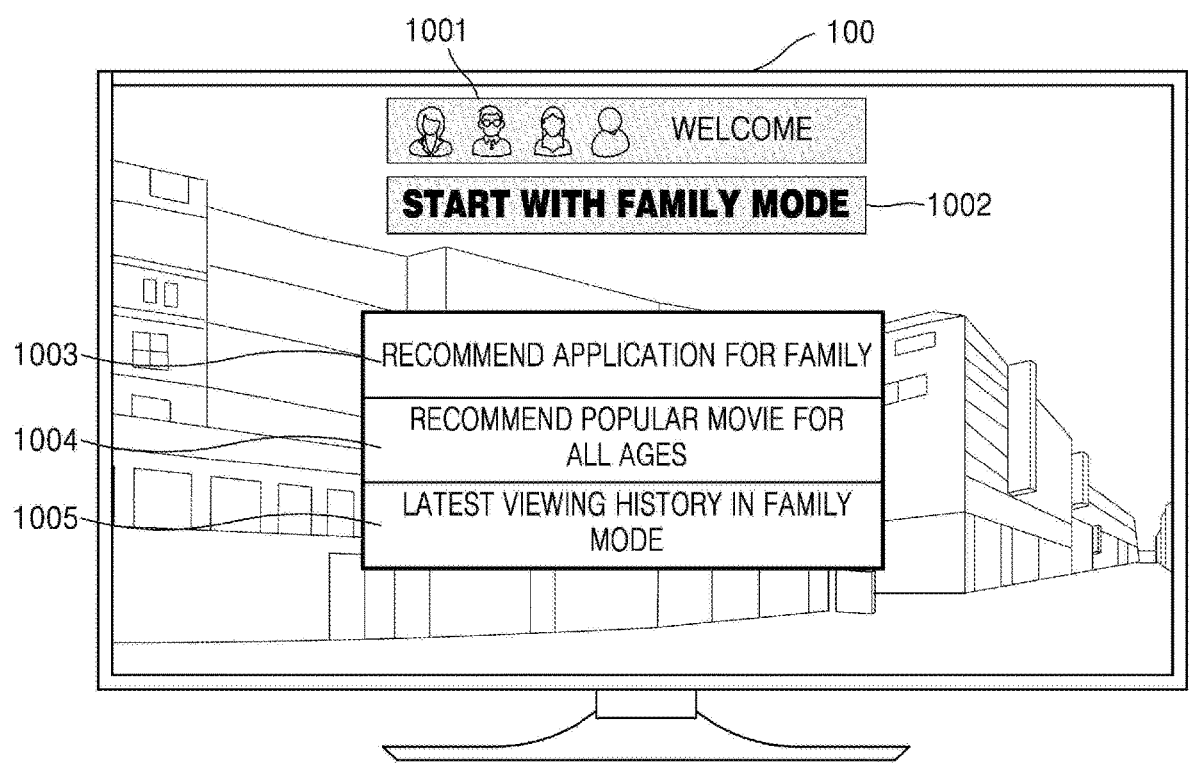
FIG. 10 is a diagram illustrating an example customized screen provided when it is started in a family mode, according to an embodiment of the disclosure.

FIG. 10 is a diagram illustrating an example of a customized screen provided when it is started in a family mode, according to an embodiment of the disclosure.

In an example embodiment of the disclosure, the display apparatus 100 may identify that a plurality of users are in an available zone in which the display apparatus 100 is viewable, when a connection signal of the second device 220 is received from the first device 210 during establishing communication with the first device 210.

The display apparatus 100 may provide a screen in a family mode when a power ON signal including information regarding a first user is received from the first device 210. In an example embodiment of the disclosure, the screen in the family mode may be a screen that is set to be displayed when a plurality of viewers view the display apparatus 100.

In an example embodiment of the disclosure, a message 1001 including an icon representing the number of registered users may be displayed in the screen in the family mode. The display apparatus 100 may notify that the display apparatus 100 is operated in the family mode through a notification message 1002.

In an example embodiment of the disclosure, the display apparatus 100 may further display a message 1003 recommending an application determined in consideration of registered users' taste, a message 1004 recommending content in the family mode, and a message 1005 including latest viewing history in the family mode.

Figure 11:
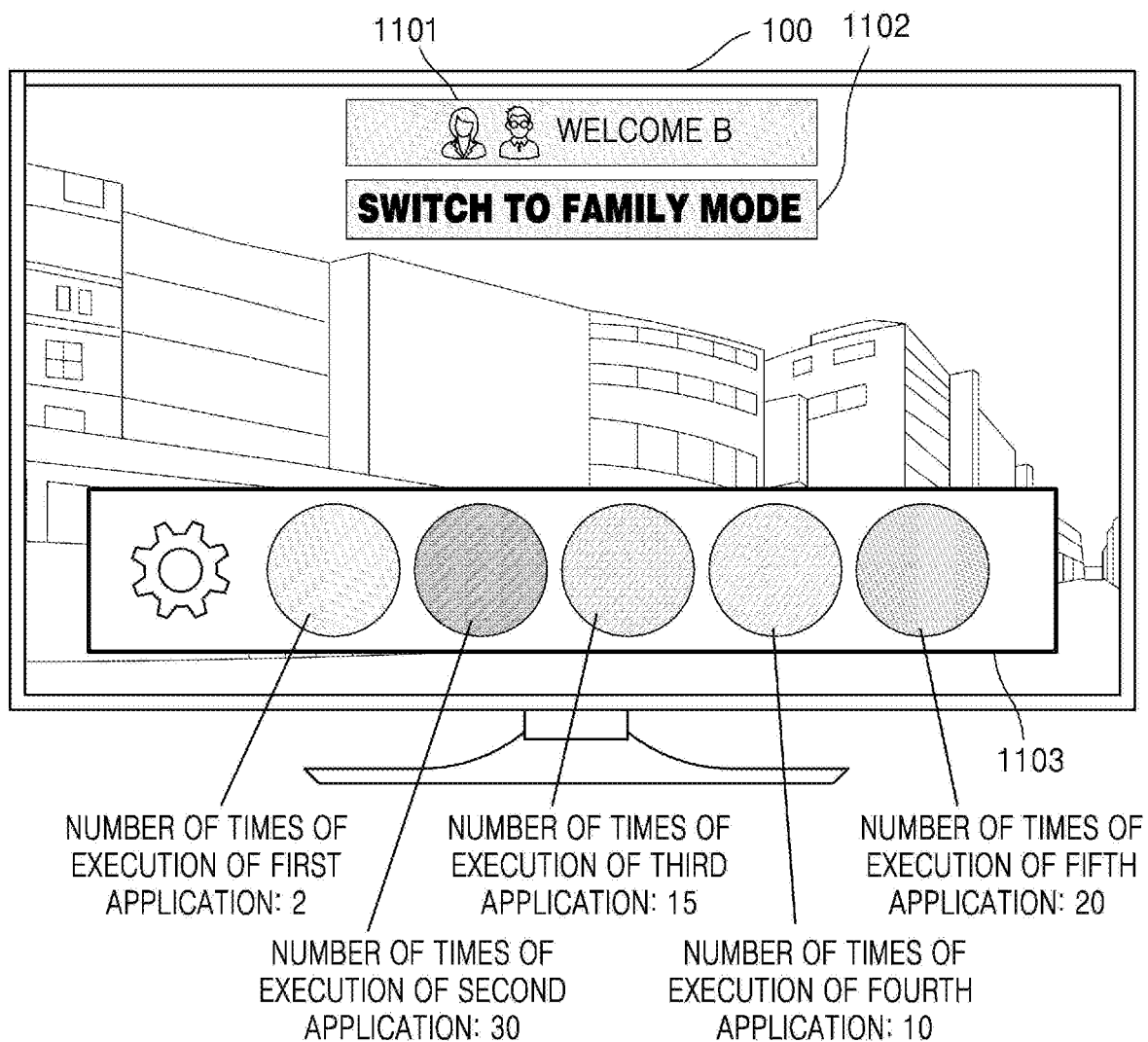
FIG. 11 is a diagram illustrating an example customized screen provided when switching to the family mode, according to an embodiment of the disclosure.

FIG. 11 is a diagram illustrating an example of a customized screen provided when switching to the family mode, according to an embodiment of the disclosure.

In an example embodiment of the disclosure, when it is determined that a new viewer appears during providing of a customized screen in an individual mode, the display apparatus 100 may provide a screen switched to the family mode.

The display apparatus 100 may notify the addition of the new viewer through a notification message 1101. When a previously registered viewer is added, the notification message 1101 may indicate identification information of the viewer.

The display apparatus 100 may notify that the family mode is switched to due to the addition of the new viewer, through an additional notification message 1102.

In an example embodiment of the disclosure, the display apparatus 100 may display a list of applications 1103 executed in the family mode. In an example embodiment of the disclosure, the display apparatus 100 may display the list of applications 1103 according to a certain criterion. For example, the list of applications 1103 may be displayed based on an order in which applications were most recently executed, a number of times of execution of the applications, user input, etc.

Figure 12:
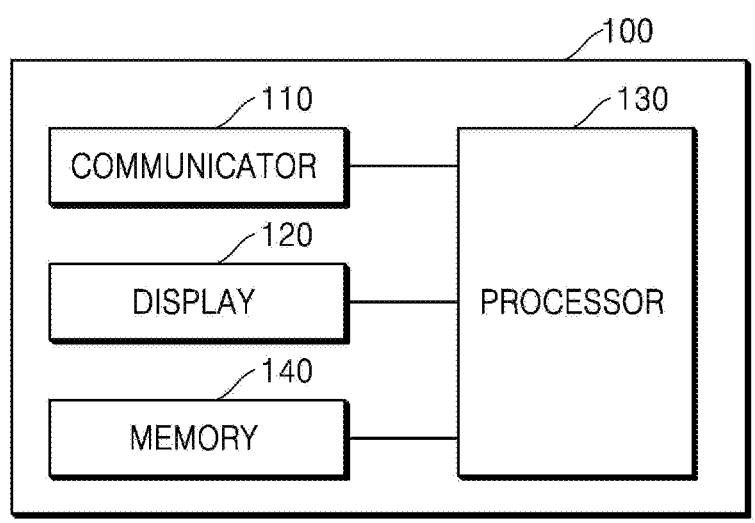
FIG. 12 is a block diagram illustrating an example structure of a display apparatus according to an embodiment of the disclosure.

FIG. 12 is a block diagram illustrating an example structure of a display apparatus 100 according to an embodiment of the disclosure.

As illustrated in FIG. 12, the display apparatus 100 according to an embodiment of the disclosure may include a communicator (e.g., including communication circuitry) 110, a display 120, a processor (e.g., including processing circuitry) 130, and a memory 140.

In an example embodiment of the disclosure, the communicator 110 may include various communication circuitry and communicate with at least one device located in the available zone which is a range in which content is viewable. The communicator 110 is configured to enable the display apparatus 100 to communicate with various external devices, such as an external device, a set-top box, and a server, in various ways. For example, the communicator 110 may include various communication circuitry, such as, for example, and without limitation, a short-range communication module, a wired communication module, a mobile communication module, etc.

The short-range communication module may refer, for example, to a module including circuitry for performing short-range communication with a device located within a certain distance. Examples of near-field communication technology may include, but are not limited to, wireless LAN, Wi-Fi, Bluetooth, ZigBee, Wi-Fi Direct (WFD), ultra wideband (UWB), infrared data association (IrDA), Bluetooth Low Energy (BLE), Near-Field Communication (NFC), etc.

The wired communication module may refer, for example, to a module including circuitry for communication using an electric signal or an optical signal. Examples of wired communication technology may include wired communication technology using a pair cable, a coaxial cable, an optical fiber cable, or the like, and may include wired communication technology obvious to those of ordinary skill in the art.

The wireless communication module may refer, for example, to a module including circuitry that transmits a radio signal to and receives a radio signal from at least one of a base station, an external device, or a server in a mobile communication network. Here, examples of the radio signal may include a voice call signal, a video call signal, or various types of data according to transmission or reception of text/multimedia messages.

In an example embodiment of the disclosure, the display 120 may provide a screen customized for a user. The display 120 is an electronic device capable of outputting content. For example, the display apparatus 100 may be a smart TV but is not limited thereto. The content may be broadcast content provided by, for example, and without limitation, terrestrial broadcasting, cable broadcasting, satellite broadcasting, or Internet broadcasting, or the like, or may be video-on-demand (VOD) content provided via a VOD service.

The display apparatus 100 may receive content via a broadcast channel or the Internet, and output the content. The display apparatus 100 may receive content from an external device connected thereto via wire or wirelessly, and output the content. Content may be stored in a memory included in the display apparatus 100, and may be output. The content may include content information identifying the content. The display apparatus 100 may identify the content that is being output, based on the content information.

In an example embodiment of the disclosure, the processor 130 may include various processing circuitry and be configured by executing instructions to establish communication with the first device 210 located in an available zone, receive connection information of the second device 220 connected to the first device 210 from the first device 210, and identify whether the second device 220 is in the available zone, based on information regarding communication between the first device 210 and the second device 220.

In an example embodiment of the disclosure, the memory 140 may include a memory storing instructions executable by the processor 130. The memory 140 may store a program for processing and controlling performed by the processor 130, and store content information output from the display apparatus 100.

The memory 140 may include at least one type storage medium among, for example, and without limitation, a flash memory type storage medium, a hard disk type storage medium, a multimedia card micro type storage medium, a card type memory (e.g., SD or XD memory), a random access memory (RAM), a static RAM (SRAM), a read-only memory (ROM), an electrically erasable programmable ROM (EEPROM), a programmable ROM (PROM), a magnetic memory, a magnetic disk, an optical disc, or the like.

The memory 140 may store either an input image and/or guide information output from the device 210. The memory 140 may store certain information to determine whether the guide information is to be output.

Figure 13:
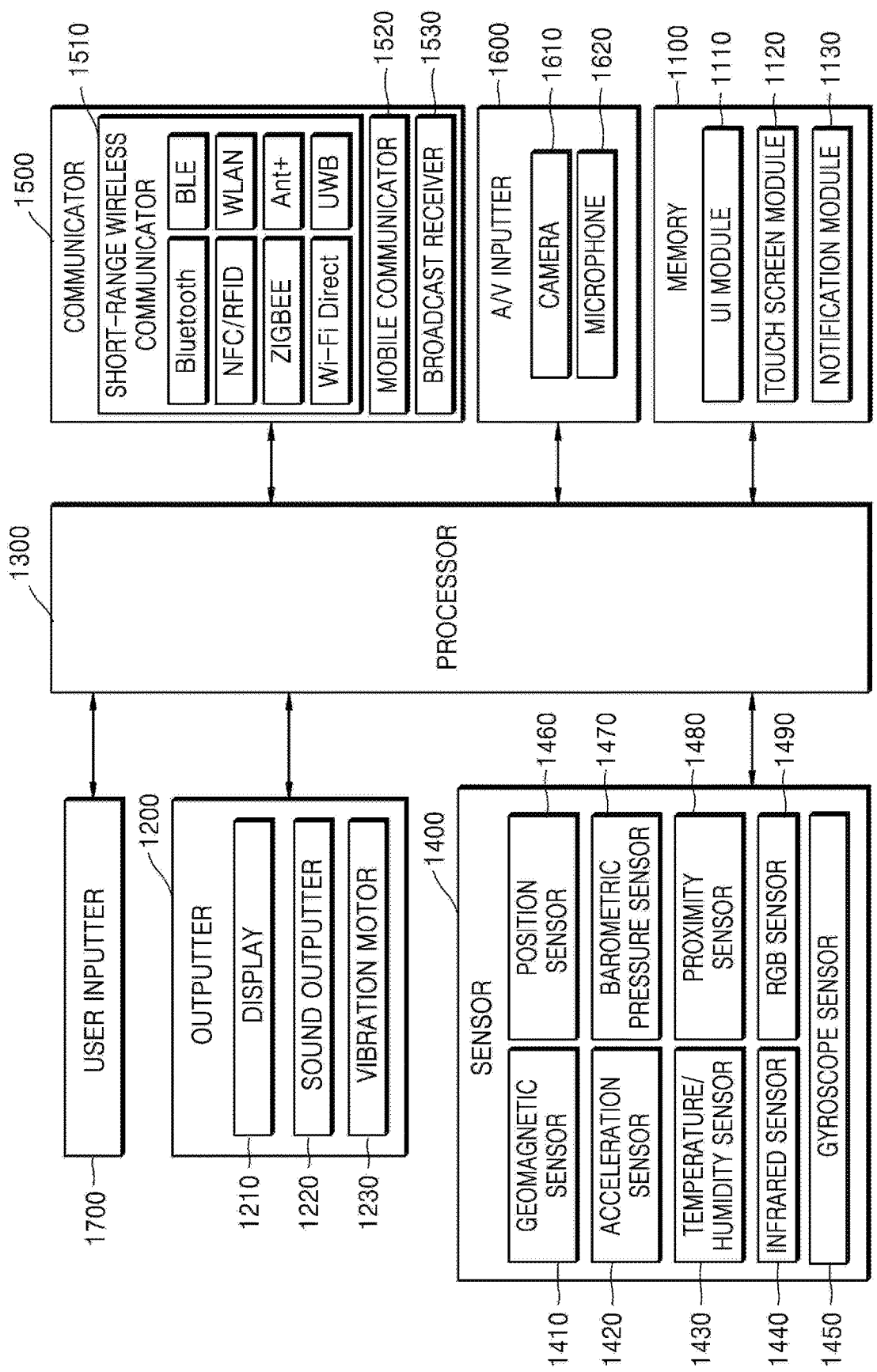
FIG. 13 is a block diagram an example structure of an apparatus according to an embodiment of the disclosure.

FIG. 13 is a block diagram illustrating an example structure of an apparatus according to an embodiment of the disclosure.

In an example embodiment of the disclosure, a first device 210 illustrated in FIG. 13 may, for example, be a device of a user registered in advance with the display apparatus 100, and may establish communication with the display apparatus 100 in an available zone.

As illustrated in FIG. 13, the first device 210 according to an embodiment of the disclosure may include a memory 1100, a display 1210, a camera 1610, a processor (e.g., including processing circuitry) 1300, an outputter (e.g., including output circuitry) 1200, a communicator (e.g., including communication circuitry) 1500, a sensor 1400, an audio/video (A/V) inputter (e.g., including A/V input circuitry) 1600, and a user inputter (e.g., including input circuitry) 1700.

The memory 1100 may store a program for processing and controlling performed by the processor 1300, and may store an image input to the first device 210 or guide information output from the first device 210. The memory 1100 may store certain information to determine whether the guide information is to be output or not.

The memory 1100 may include at least one type storage medium among, for example, and without limitation, a flash memory type storage medium, a hard disk type storage medium, a multimedia card micro type storage medium, a card type memory (e.g., SD or XD memory), a random access memory (RAM), a static RAM (SRAM), a read-only memory (ROM), an electrically erasable programmable ROM (EEPROM), a programmable ROM (PROM), a magnetic memory, a magnetic disk, an optical disc, or the like.

Programs stored in the memory 1100 may be classified into a plurality of modules according to functions thereof. For example, the programs may be classified into a user interface (UI) module 1110, a touch screen module 1120, a notification module 1130, etc.

The UI module 1110 may provide a specialized UI or GUI operated in connection with the first device 210 in units of applications. The touch screen module 1120 may sense a user's touch gesture on a touch screen and transmit information regarding the touch gesture to the processor 1300. In an example embodiment of the disclosure, the touch screen module 1120 may identify and analyze touch code. The touch screen module 1120 may be configured as separate hardware including a controller.

The notification module 1130 may generate a signal for notifying occurrence of an event of the first device 210. Examples of an event generated in the first device 210 include reception of a call signal, reception of a message, an input of a key signal, and schedule notification. The notification module 1130 may output a notification signal in the form of a video signal through the display 1210, may output a notification signal in the form of an audio signal through a sound outputter 1220, or may output a notification signal in the form of a vibration signal through a vibration motor 1230. For example, the notification module 1130 may generate a signal for outputting guide information, based on estimated lane information.

The outputter 1200 may include various output circuitry and output an audio signal, a video signal, and/or a vibration signal. The outputter 1200 may include display 1210, a sound outputter 1220, and a vibration motor 1230.

The display 1210 displays and outputs information processed by the first device 210. In detail, the display 1210 may output an image captured by the camera 1610. Alternatively, the display 1210 may combine guide information generated by the processor 1300 with the captured image, and output a result of combining the guide information with the image.

In addition, the display 1210 may display a user interface for performing an operation related to user input, in response to the user input.

The sound outputter 1220 may include various sound output circuitry and outputs audio data received from the communicator 1500 or stored in the memory 1100. In addition, the sound outputter 1220 outputs a sound signal (e.g., call signal reception sound, message reception sound, or notification sound) related to a function performed in the first device 210. For example, the sound outputter 1220 may output, as a sound signal, guide information generated as a signal by the notification module 1130 under the control of the processor 1300.

Generally, the processor 1300 may include various processing circuitry and controls overall operations of the first device 210. For example, the processor 1300 may execute programs stored in the memory 1100 for overall control of the user inputter 1700, the outputter 1200, the sensor 1400, the communicator 1500, the A/V inputter 1600, etc. Furthermore, the processor 1300 may execute the programs stored in the memory 1100 to perform the functions of the first device 210.

The sensor 1400 may sense a state of the first device 210 and/or a state of the vicinity of the first device 210, and transmit information obtained as a result of the sensing to the processor 1300.

The sensor 1400 may include, but is not limited to, at least one of a geomagnetic sensor 1410, an acceleration sensor 1420, a temperature/humidity sensor 1430, an infrared sensor 1440, a gyroscope sensor 1450, a position sensor (e.g., a GPS) 1460, a barometric pressure sensor 1470, a proximity sensor 1480, and/or an RGB sensor 1490. The function of each of these sensors may be intuitively deduced from the name thereof by those of ordinary skill in the art and thus a detailed description thereof will be omitted here.

In an example embodiment of the disclosure, the sensor 1400 is capable of measuring the distance between a vehicle and at least one object determined from a captured image.

The communicator 1500 may include at least one component including various communication circuitry for enabling the first device 210 to communicate with another device (not shown) and a server (not shown). The other device may be a computing device such as the first device 210 or a sensing device but is not limited thereto. For example, the communicator 1500 may include a short-range wireless communicator 1510, a mobile communicator 1520, and a broadcast receiver 1530.

Examples of the short-range wireless communicator 1510 may include various communicators including various communication circuitry, such as, for example, and without limitation, a Bluetooth communicator, a Bluetooth Low Energy (BLE) communicator, a Near-Field Communication (NFC)/Radio Frequency Identification (RFID) unit, a WLAN (Wi-Fi) communicator, a ZigBee communicator, a Wi-Fi Direct (WFD) communicator, a ultra wideband (UWB) communicator, an Ant+ communicator, etc. For example, the short-range wireless communicator 1510 may receive lane number information from a navigation device included in a vehicle through short-range wireless communication.

The mobile communicator 1520 may include various communication circuitry and transmits a radio signal to or receive a radio signal from at least one of a base station, an external terminal, or a server in a mobile communication network. Here, the radio signal may include a voice call signal, a video call signal, or various types of data according to transmission or reception of text/multimedia messages.

The broadcast receiver 1530 may include various communication circuitry and receives a broadcast signal and/or broadcast-related information from the outside via a broadcast channel. The broadcast channel may include a satellite channel and a terrestrial channel. In an example embodiment of the disclosure, the first device 210 may not include the broadcast receiver 1530.

The A/V inputter 1600 may include various A/V input circuitry and is configured to input an audio signal or a video signal and may include the camera 1610, a microphone 1620, etc. The camera 1610 may capture an image frame, such as a still image or a moving picture, via an image sensor in a video call mode or a shooting mode. An image captured via the image sensor may be processed by the processor 1300 or an additional image processor (not shown).

In an example embodiment of the disclosure, the camera 1610 may capture an image of surroundings of a vehicle. For example, the camera 1610 may capture an image of surroundings in front of a moving vehicle but is not limited thereto.

The microphone 1620 receives an external sound signal and processes it into electrical voice data. For example, the microphone 1620 may receive a sound signal from an external device or a user. The microphone 1620 may receive the user's voice input. The microphone 1620 may use various noise reduction algorithms to remove noise generated during receiving of an external sound signal.

The user inputter 1700 may include various circuitry for a user to input data for control of the first device 210. Examples of the user inputter 1700 may include, but are not limited to, a key pad, a dome switch, a touch pad (a touch-type capacitive touch pad, a pressure-type resistive overlay touch pad, an infrared sensor-type touch pad, a surface acoustic wave conduction touch pad, an integration-type tension measurement touch pad, or a piezo effect-type touch pad), a jog wheel, a jog switch, etc.

An example embodiment of the disclosure may be embodied in the form of a recording medium storing instructions, such as computer-executable program modules, which are executable by a computer. Such computer-readable recording media may be any available media that are accessible by a computer, and include all a volatile medium, a nonvolatile medium, a separable medium, and a non-separable medium. Such computer-readable recording media may also include both a computer storage medium and a communication medium. Examples of the computer storage medium include all a volatile medium, a nonvolatile medium, a separable medium, and a non-separable medium which are implemented by any method or technology for storing information, such as computer-readable instructions, data structures, program modules or other data. Examples of the communication medium include computer-readable instructions, data structures, program modules, other data of a modulated data signal, or other transport mechanisms, and include any information transport media.

As used herein, the term "unit" may refer to a hardware component such as a processor or a circuit, and/or a software component executed by a hardware component such as a processor.

The above description of the disclosure is merely intended to give examples, and it will be apparent to those of ordinary skill in the art that various modifications and changes may be made therein without departing from the spirit or scope of the disclosure. Therefore, the embodiments set forth herein should be considered in a descriptive sense only and not for purposes of limitation. For example, each component described as a single entity may be distributed and implemented, and components described as distributed may also be implemented in a combined form.

The scope of the disclosure may be defined, for example, by the following claims, not by the detailed description. It should be understood that all changes or modifications derivable from the meaning and scope of the claims and equivalents thereto are included in the scope of the disclosure.

What is claimed is:

1. A method of a display apparatus, the method comprising:
   establishing communication with a first device located in an available zone of the display apparatus, the available zone being a range in which content of the display apparatus is viewable;
   receiving a communication signal from a second device;
   receiving, from the first device, connection information between the first device and the second device connected to the first device;
   determining whether the second device is located in the available zone based on the communication signal received from the second device and the connection information between the first device and the second device; and
   providing a customized screen based on determining that the second device is located in the available zone.

2. The method of claim 1, wherein the identifying of whether the second device is located in the available zone comprises, based on a communication signal of a certain strength or greater being received from the second device for a certain time, identifying that the second device is located in the available zone based on the connection information of between the first device and the second device.

3. The method of claim 2, wherein the determining of whether the second device is located in the available zone comprises identifying that the second device is located in the available zone based on a strength of connection between the first device and the second device being greater than or equal to a certain strength and a duration of connection between the first device and the second device being greater than or equal to a certain time.

4. The method of claim 1, wherein the establishing of communication with the first device comprises:
   identifying whether a strength of a communication signal received from the first device is greater than or equal to a threshold value;
   receiving, from the first device, a power-on signal including information regarding a first user; and
   providing a first screen corresponding to the information regarding the first user, based on the power-on signal being received.

5. The method of claim 4, wherein the first screen comprises at least one of:
   a latest viewing history of the first user; or
   application update information received from the first device.

6. The method of claim 1, further comprising:
   obtaining an artificial intelligence training model based on a result of learning a degree of interest of the first user, based on the first user's viewing history and search history;
   determining an application and content to be recommended using the obtained artificial intelligence training model; and
   providing a first screen including the recommended application and content.

7. The method of claim 1, further comprising:
   receiving, from the first device, information obtained by sensing a position and an operation of the second device, and
   identifying whether the second device is located in the available zone based on the information obtained by sensing the position and the operation of the second device.

8. The method of claim 1, further comprising, based on identifying that the second device is located in the available zone, providing a second screen in a general mode.

9. The method of claim 1, further comprising:
   obtaining an artificial intelligence training model based on a result of learning a relationship between the first device and the second device, based on information regarding communication between the first device and the second device;
   determining an application and content to be recommended based on a common interest between the first device and the second device using the obtained artificial intelligence training model; and
   providing a second screen including the recommended application and content.

10. The method of claim 9, wherein, in the artificial intelligence training model, the information regarding communication between the first device and the second device is analyzed to identify content viewing history information and application use history information; weights are assigned to content and applications based on content viewing periods, a number of times of viewing the content, types of the content, genres of the content, periods of use of the applications, a number of times of use of the applications, and types of the applications; and the recommended application and content are determined based on the assigned weights.

11. The method of claim 1, further comprising:
    receiving, from the first device, information regarding a plurality of devices connected to the first device;
    determining at least one of an application or content to be recommended, using information regarding the first device and the information regarding the plurality of devices; and
    providing a screen including the determined at least one recommended application or content.

12. The method of claim 1, further comprising:
    establishing communication with a third device located in the available zone;
    receiving, from the third device, connection information between the third device and a fourth device connected to the third device;
    identifying whether the fourth device is located in the available zone based on the connection information between the third device and the fourth device; and
    providing the customized screen based on information regarding a plurality of devices identified as being located in the available zone.

13. The method of claim 12, further comprising:
    obtaining an artificial intelligence training model based on a result of learning a relationship between the first, second, third and fourth devices based on information regarding communication between the first, second, third and fourth devices;

determining an application and content to be recommended based on a common interest between the first, second, third and fourth devices using the obtained artificial intelligence training model; and providing the customized screen including the recommended content and application.

14. A non-transitory computer-readable recording medium storing a program for implementing the method of claim 1.

15. A display apparatus comprising:
a display providing a screen customized for a user;
a communicator comprising communication circuitry configured to communicate with a device located in an available zone, the available zone being a range in which content of the display apparatus is viewable;
a processor; and
a memory storing instructions executable by the processor,
wherein the processor is configured to, by executing the instructions, control the display apparatus to:
establish communication with a first device located in the available zone,
receive, from the first device, connection information between the first device and a second device connected to the first device,
determine whether the second device is located in the available zone based on the connection information between the first device and the second device, and
provide a customized screen based on determining that the second device is located in the available zone.

16. The display apparatus of claim 15, wherein the processor is further configured to, by executing the instructions, control the display device to:
identify whether a strength of a communication signal received from the first device is greater than or equal to a threshold value,
receive, from the first device, a power-on signal including information regarding a first user, and,
based on the power-on signal being received, provide a first screen corresponding to the information regarding the first user.

17. The display apparatus of claim 15, wherein the processor is further configured to, by executing the instructions, control the display apparatus to:
obtain an artificial intelligence training model based on a result of learning a degree of interest of the first user, based on the first user's viewing history and search history,
determine an application and content to be recommended using the obtained artificial intelligence training model, and
provide a first screen including the recommended application and content.

18. The display apparatus of claim 15, wherein the processor is further configured to, by executing the instructions, control the display apparatus to:
identify that the second device is located in the available zone based on a strength of connection between the first device and the second device being greater than or equal to a certain strength and a duration of connection between the first device and the second device being greater than or equal to a certain time period.

19. The display apparatus of claim 15, wherein the processor is further configured to, by executing the instructions, control the display apparatus to:
receive, from the first device, information obtained by sensing a position and an operation of the second device, and
identify whether the second device is located in the available zone based on the information obtained by sensing the position and the operation of the second device.

20. The display apparatus of claim 15, wherein the processor is further configured to, by executing the instructions, control the display apparatus to:
provide a second screen in a general mode based on identifying that the second device is located in the available zone.

* * * * *